Oct. 11, 1927.　　　　　　　　　　　　　　　　1,644,783
K. G. LISSEL
ADJUSTING ARRANGEMENT FOR SPRINGS USED IN HYDROSTATIC LOGS
FOR BALANCING THE PRESSURE
Filed April 11, 1923
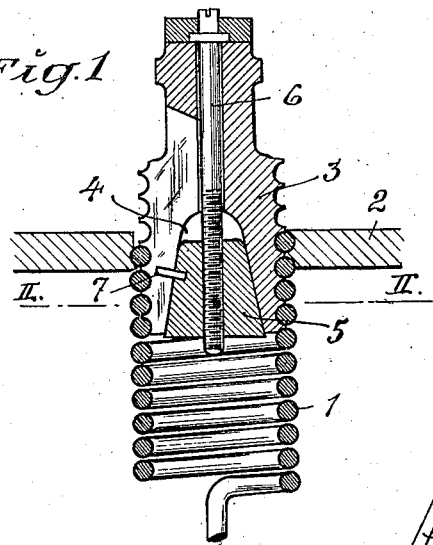
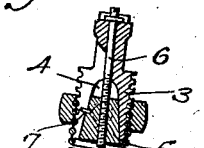
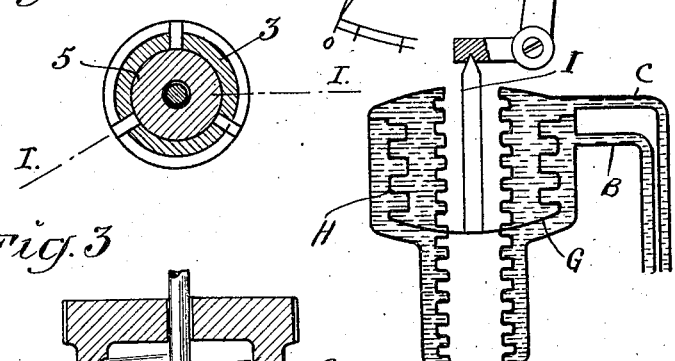
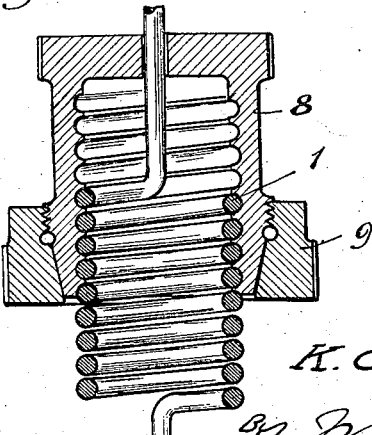
Inventor:
K. G. Lissel Patented Oct. 11, 1927.

1,644,783

UNITED STATES PATENT OFFICE.

KARL GUSTAF LISSEL, OF STOCKHOLM, SWEDEN, ASSIGNOR TO SVENSKA AKTIEBOLAGET LOGG, OF STOCKHOLM, SWEDEN, A CORPORATION OF SWEDEN.

ADJUSTING ARRANGEMENT FOR SPRINGS USED IN HYDROSTATIC LOGS FOR BALANCING THE PRESSURE.

Application filed April 11, 1923, Serial No. 631,461, and in Sweden July 26, 1922.

In technical practice it is often important to be able to obtain a continuous variation of the elasticity of a spiral wound spring for the purpose of adjustment. This is particularly the case in such log instruments in which the action is based upon the Pitot tube principle (hydrostatic logs). The pressure created by the velocity of the ship is balanced in various ways by a spiral wound spring and a certain adjustment of the elasticity of the spring is necessary in order to make the indications correct.

This will be clearly understood by the following:

The relation between the pressure $p$ and the speed $v$ of a ship, can be expressed by the formula $p=kv^2$. $k$ is a constant, the "Pitot constant", which varies according to the circumstances and which is different on different ships. It is thus obvious that some means must be provided in order to make the adjustment of this Pitot constant $k$ possible.

The present invention, which relates to a reliable and continuously acting device to obtain an adjustment for use with springs for hydrostatic logs, in which the two elements between which the spring acts are respectively connected to the ends of said spring, is characterized by a member held in position solely by the coils of the spring which member is provided with threads or similar arrangements which co-operate with the spring in such a manner that by turning or moving the member in one direction or the other said member can be engaged with a variable number of turns to hold them rigid, so that the number of the remaining active spiral turns is increased or decreased, whereby the elasticity of the spring may be correspondingly changed without changing the initial tension of the spring. The member can be arranged either inside or outside the spring or as well inside as outside. The member should further be arranged so that the same can be locked in the position which it is set for.

In the annexed drawings:—

Figure 1 shows an example of a device according to this invention, and is a section on the line I—I of Fig. 2;

Fig. 2 is a section on the line II—II of Fig. 1;

Fig. 3 shows another example of a device according to this invention.

Fig. 4 shows how the device in Fig. 1 may be applied to a hydrostatic log.

1 in Fig. 1 is a cylindrical spiral spring one end of which is fastened to the support 2, which can be assumed as acting upon the indicating member of a log instrument based upon, for instance, the Pitot tube principle. Inside the spring is screwed a member 3, see also Figure 2. By screwing the member 3 further into the spring, the number of the free turns of the spring is decreased and in screwing the member out the same is increased. The elasticity of the spring is then correspondingly changed, without affecting its initial tension. It is thus possible to adjust the spring by means of the member 3 in such a manner that the indicating mechanism of the log instrument will give correct readings corresponding to the Pitot constant of the particular ship for which the log instrument is intended.

The member 3 is, as shown, in one end hollow at 4 and split. In the hollow part is fitted a cone 5, which can be tightened by means of a screw 6 whereby the split end of the member 3 is forced outwards and the member 3 thus locked through the contact with the spiral turns into which it is screwed. By turning the screw 6 in the other direction the pressure of the cone can be made to cease and the member 3 unlocked. When tightening and releasing the cone 5 by means of the screw 6, the pin 7 prevents the cone from turning.

The device as shown in Fig. 3 is somewhat differently arranged. A sleeve 8 threaded on its inner side is screwed on the outside of the spring 1. The lower end of the sleeve is split and provided with threads. By means of a nut 9, the sleeve can be locked to the spring in any position.

In Fig. 4 is shown a hydrostatic log to which the spring device is applied. The tubes B and C are connected respectively to the Pitot tube and static conduit of a pressure measuring apparatus of the Pitot type. The bellows H is provided with a bottom G, the difference in pressure inside and outside the bellows effecting movement of the bottom G to which is connected a rod L, Through the medium of the lever J, movement of the bottom is transmitted to the indicator K. The spring device described above is applied to lever J to effect adjustment of this lever as shown in Fig. 4.

Naturally the above described details can be replaced by others having similar effects and serving the same purpose.

In certain cases it may be desirable to combine the different arrangements of the devices as shown in Figs. 1 and 3. Thus, a device according to Figure 3 could have a member 3 and cone 5 (Figure 1) arranged inside the spring. An adjustment of the elasticity could then be effected by setting simultaneously both the member 3 and the sleeve 8, in which case the sleeve need not necessarily be provided with the nut 9 or any similar locking device, Fig. 4 shows the application of the adjusting device to the hydrostatic log which is diagrammatically illustrated in Fig. 1 of my co-pending application Serial No. 631,460, filed April 11, 1923.

In certain cases the above described adjusting arrangement can be combined with a device for the regulation of the initial tension of the spring, whereby a wider range of adjusting the indicating mechanism of a log instrument is obtained, so that this will give correct readings under all conditions.

What I claim and desire to secure by Letters-Patent is:

1. In hydrostatic logs, a device for permitting a continuous adjustment of the elasticity of the cylindrical spiral spring counteracting the pressure, comprising a member held in position solely by the coils of the spring, said member being split at one end and provided with threads adapted to cooperate with the turns of said spring, said member being further adapted to be turned to engage a variable number of turns of the spring to decrease or increase the remaining active spiral turns, and means for radially adjusting the split end of said member to hold rigid the turns of the spring engaged by said member, whereby the elasticity of the spring may be changed without changing the initial tension of the spring.

2. In hydrostatic logs, a device for permitting a continuous adjustment of the elasticity of the cylindrical spiral spring counteracting the pressure, comprising a member held in position solely by the coils of the spring, said member being split at one end and provided with threads adapted to cooperate with the turns of said spring, said member being further adapted to be turned to engage a variable number of turns of the spring to decrease or increase the remaining active spiral turns, said split end being provided with a conical surface, and locking means engaging said conical surface for adjusting the split end radially to lock said member on the spring, whereby the elasticity of the spring may be changed without changing the initial tension of the spring.

In testimony whereof I have affixed my signature.

KARL GUSTAF LISSEL.